United States Patent [19]
Willenbrock

[11] 4,084,215
[45] Apr. 11, 1978

[54] STROBE LIGHT HAVING REDUCED ELECTROMAGNETIC RADIATION

[75] Inventor: John C. Willenbrock, Indianapolis, Ind.

[73] Assignee: The United States of America as represented by the Secretary of the Navy, Washington, D.C.

[21] Appl. No.: 772,221

[22] Filed: Feb. 25, 1977

[51] Int. Cl.² .............................. F21V 7/04; B64F 1/20
[52] U.S. Cl. ..................................... 362/32; 313/313; 315/85; 315/241 S; 362/62
[58] Field of Search ................. 240/1.2, 7.7; 313/313; 315/85, 241 S; 325/350; 362/32, 62

[56] References Cited
U.S. PATENT DOCUMENTS

| 2,936,387 | 5/1960 | Steele et al. ............... 315/241 S |
| 3,801,808 | 4/1974 | Johnson .................... 313/313 |
| 3,939,379 | 2/1976 | Sullivan et al. ............ 313/313 |
| 4,000,432 | 12/1976 | Coon et al. ............... 313/313 |

*Primary Examiner*—Leland A. Sebastian
*Attorney, Agent, or Firm*—R. S. Sciascia; Paul S. Collignon

[57] ABSTRACT

A high intensity strobe light having reduced electromagnetic radiation. A flash tube is mounted on a housing designed to both reduce electromagnetic interference and protect the flash tube from the environment, and light from the flash tube is piped to a reflector. The light pipe is surrounded by a waveguide proportioned to operate below cutoff frequency thereby providing attenuation to undesirable RF radiated from the flash tube.

14 Claims, 3 Drawing Figures

U.S. Patent     April 11, 1978     4,084,215 ic radiation.

STROBE LIGHT HAVING REDUCED ELECTROMAGNETIC RADIATION

BACKGROUND OF THE INVENTION

The present invention relates to a strobe light and more particularly to a high intensity strobe light for anti-collision systems.

An increased usage of strobe lights on aircraft, particularly military aircraft, is being made so that a high percentage of mid-air collisions and near-misses might be eliminated. A recent safety survey indicates that about 85 percent of mid-air collisions and near-misses have occurred during daylight with clear weather conditions and with about 80 percent of the aircraft having radar and/or radio contact with air traffic control at the time. These statistics tend to confirm that the present day incandescent rotating beacons on aircraft are adequate for night operation but are not bright enough for daylight operation in clear weather.

The replacement of rotating beacons with presently available strobe lights has caused additional problems with the main problem being that of electromagnetic interference. Commercially available strobe lights generally have a zenon flash tube and reflector, a bank of capacitors, and power supply and timing circuit, all of which are encased in a housing and mounted outboard on an aircraft appendage, such as a wing or tail. These strobe lights, which might flash 60 to 70 times a minute, produce electromagnetic radiation which interfers with the aircraft's navigation and communication system to such an extent that the safety of the aircraft becomes of concern.

A flash tube is generally comprised of two spaced apart electrodes within a sealed glass envelope having a rare gas fill, typically xenon, at a sub-atmospheric pressure. Such lamps are connected across a large capacitor charged to a substantial potential, which is, however, insufficient to ionize the xenon fill gas. Upon application of an additional pulse of sufficient voltage, the xenon is ionized, and an electric arc is formed between the two electrodes, discharging the large capacitor through the flash tube, which emits a burst of intense light, usually of short duration. In many cases the pulse voltage is applied between an external trigger wire wrapped around the envelope and the electrodes; this is referred to as shunt triggering. In other applications, the lamp may be internally triggered by applying the pulse voltage directly across the electrodes, a technique referred to as injection triggering.

When the flash tube ignites upon being pulse triggered, it has been observed to inherently produce radio frequency (RF) interference from 14 KHz and 1 GHz. Such radiated RF noise is extremely undesirable in a number of applications in the broadcast band (540–1770 KHz), the VHF band (50–500 MHz) and the UHF band (300–500 MHz) where it interferes with direction finding, navigation and VHF and UHF communications equipment.

In addition to being a source of undesirable radiation, the outboard mounting of these strobe lights subjects their flash tubes to other source of radiation which is of sufficient magnitude to flash the tubes. For example, a high-powered search radar might trigger a flash tube during every revolution of the radar's antenna and thus greatly reduce the life of the tube. As these flash tubes are relatively expensive and only have an average life of about 500 hours of operation, the accidental flashing greatly increases the costs of keeping these lights in operation.

Various approaches have been made in an endeavor to reduce the electromagnetic interference caused by strobe lights. For example, in U.S. Pat. No. 3,840,766, which issued Oct. 8, 1974, to John A. Pappas and Robert J. Cosco, there is described an improved flash tube with reduced RF noise emission which is accomplished by providing a flashed barium deposit on portions of the inside surface of the flash tube.

Another method employed to reduce electromagnetic interference involves coating the strobe light lens with a thin film, such as a film made of oxides of various metals, such as gold, tin, chromium and copper. Although these films reduce electromagnetic interference, they also reduce the amount of light that passes through the lens.

SUMMARY OF THE INVENTION

The present invention is for an improved strobe light which not only provides less electromagnetic interference than heretofore available lights, but also is designed to protect a flash tube so that it cannot be triggered by stray radiation.

The flash tube is placed in a housing which protects the flash tube from adverse effects of the environment and provides radiation shielding. In addition, the housing with the flash tube therein, can be mounted below the aircraft skin which provides additional protection and shielding. Light from the flash tube passes through a light pipe to a reflector and the light pipe is surrounded by a waveguide which is designed to operate below cut-off frequency thereby providing attenuation to the RF radiated from the flash tube.

It is therefore a general object of the present invention to provide an improved anti-collision strobe light which provides reduced electromagnetic interference.

Another object of the present invention is to provide a high intensity strobe light having reduced susceptibility to stray radiation.

Still another object of the present invention is to provide a strobe light which has its light system components protected from temperature, pressure, physical damage, moisture and electromagnetic radiation.

Other objects, advantages and novel features of the present invention will become apparent from the following detailed description of the invention when considered in conjunction with the accompanying drawing.

DESCRIPTION OF THE PREFERRED EMBODIMENT

Figure 1:
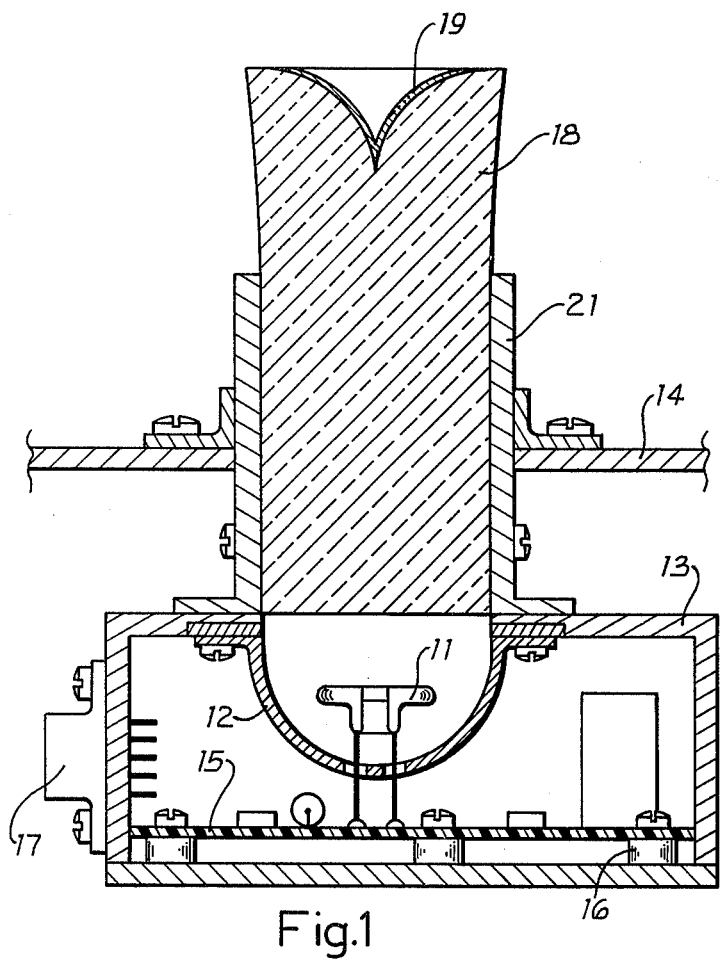
FIG. 1 is a sectional view of a preferred embodiment of the present invention.

Referring now to FIG. 1 of the drawing, a flash tube 11 and reflector 12 are mounted in a housing 13 which is designed to be mounted beneath the aircraft skin 14, such as the skin of a wing. Housing 13 is designed to reduce the effects of the magnetic field produced by current pulses and is preferably made of high mu material, such as Mu-metal, Permalloy and Hypernom. Flash tube 11 might be of a commercially available type and be comprised of two spaced apart electrodes within a sealed glass envelope having a rare gas fill, typically xenon, at a sub-atmospheric pressure. Such lamps are connected across a large capacitor charged to a substantial potential, which is, however, insufficient to ionize the xenon fill gas. Upon application of an additional pulse of sufficient voltage, the xenon is ionized, and an electric arc is formed between the two electrodes, discharging the large capacitor through the flash tube, which emits a burst of intense light, usually of short duration.

The spectrum of radiated energy from a commercially available flash tube 11 extends from about 100 to 1000 nanometers with the visible portion of the spectrum extending from about 400 to 700 nanometers. The amount of energy radiated into the visible portion of the spectrum amounts to about 30 percent of the total energy produced and the remaining 70 percent of the energy is radiated in the form of ultraviolet (UV) and infrared (IR). The optimal choice of flash duration appears to be about 0.2 second. A longer flash duration does not make the flash appear more intense and a shorter flash duration appears less intense.

In addition to flash tube 11 and reflector 12, a strobe light system is comprised of a power supply, storage capacitors, and electronic circuits to set the pulse rate. A circuit board 15 is mounted on standoffs 16 within housing 13 and supports the necessary components and circuitry for operating flash tube 11, and an RFI reducing connector 17 is provided on housing 13 for connecting the components and circuitry to a suitable power supply.

Light from flash tube 11 is directed through a light pipe 18 to a reflector 19 which disperses the light outwardly from light pipe 18. In the embodiments shown in FIGS. 1 and 2 of the drawing, the light pipe 18 is made of plastic material, such as lucite, and reflector 19 is made integral with light pipe 18 by machining the desired curvature or surface in light pipe 18 and then coating the surface with a reflective coating 19, such as thin film metals, paint, and the like. It should be understood, of course, that various other shapes of reflectors might be used and also that a separate reflector might also be attached to light pipe 18, or to an aircraft, to provide the desired dispersion of light passing through light pipe 18. Also, it should be recognized that many other types of plastic material, as well as glass, might be used to make a suitable light pipe 18.

In the preferred embodiment shown in FIG. 1 of the drawing, a circular waveguide 21 surrounds a portion of light pipe 18 and is attached to housing 13. By way of example, waveguide 21 might be made of aluminum tubing, but also might be made of other metals and have other shapes such as being square, rectangular, tapered and the like. Waveguide 21 is specifically designed to be an attenuator for the RF energy being proprogated from flash tube 11. It is well-known that when a circular waveguide is used at a frequency where the wavelength is equal to 1.7 times the diameter, it will show little loss. This is the cut-off frequency. At frequencies below the cut-off, the waveguide becomes an attenuator. Typical applications of a waveguide as an attenuator assume the wavelength of the frequency attenuated to be 0.1 of the cut-off wavelength.

The attenuation, A, in dB at such a gap, follows the wave-guide-beyond-cut-off criteria:

$$A_{dB} = 0.0046\, L f_{MHz} \sqrt{(f_c/f_{MHz})^2 - 1} \tag{1}$$

where
$L$ = waveguide length in inches;
$f_{MHz}$ = operating frequency in MHz;
$g$ = largest diameter transverse dimension in inches; and
$f_c$ = cut-off frequency of waveguide in MHz For a circular waveguide:

$$f_c = 6920/g \tag{2}$$

When $f_c >> 10 f_{MHz}$, equation (1) above becomes:

$$A_{dB} \approx 0.0046\, L f_c = 32\, L/g\; dB$$

for circular gap.

By way of example, assume a circular waveguide has a diameter of 1.5 inches and a length of 4.5 inches. From equation (3) above, it can be seen that:

$$A_{dB} = \frac{32(4.5)}{1.5} = 96 dB; \tag{4}$$

and from equation (2) above, it can be seen that:

$$f_c = \frac{6920}{1.5} = 4613\; MHz. \tag{5}$$

For full attenuation, the wavelength of the frequency attenuated should be 0.1 of the cut-off wavelength, thus from equations (4) and (5) it can readily be seen that the attenuation of 96dB would apply to frequencies of 460 MHz and below.

Figure 3:
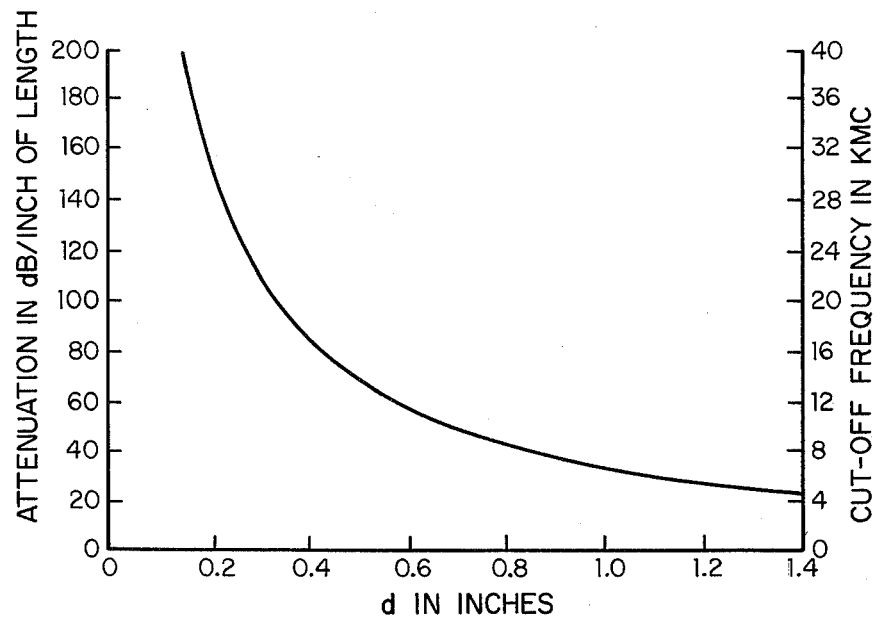
FIG. 3 is a diagram showing cut-off frequencies and attenuation values for circular waveguides of different diameters.

FIG. 3 of the drawing shows graphically the cut-off frequencies for various diameters of circular waveguides and also the attenuation per inch of length of waveguide. By way of example, assuming a circular waveguide having a 1 inch diameter and 4 inches long, it can be seen that the cut-off frequency is about 7000 MHz and the attenuation for 1 inch of length is about 32 dB. Thus, for 4 inches of length, the attenuation would be 128 dB. FIG. 3 of the drawing graphically illustrates that both the cut-off frequency and attenuation per inch of waveguide length, decreases with an increase of the waveguide diameter.

From the above-listed equations and specific examples, it can readily be seen that a waveguide 21 and light pipe 18 can be selected that would have practical dimensions for use with a strobe light.

Figure 2:
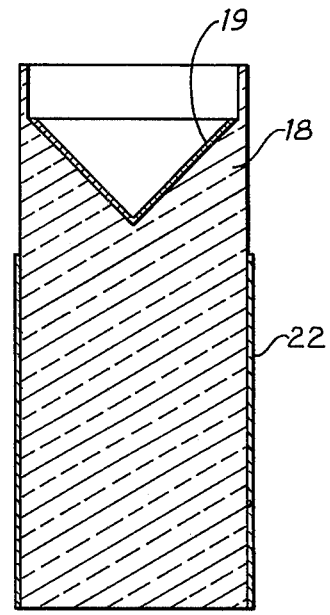
FIG. 2 is a sectional view showing another embodiment of a light pipe and waveguide.

Referring now to FIG. 2 of the drawing, there is shown a light pipe 18 having a different shaped reflector and having a waveguide which is made by applying a conductive coating 22 around the periphery of the light pipe 18. By way of example, coating 22 might be silver coated conductive paint, a conductive epoxy or a thin metallic film.

It can thus be seen that the strobe light system described herein, not only protects the flash tube and associated hardware and circuitry from adverse effects of the environment, but also the waveguide provided therewith provides effective attenuation for frequencies one octave below the design cut-off frequency of the waveguide when the length to diameter ratio is kept 3 to 1 or more.

Obviously many modifications and variations of the present invention are possible in the light of the above teachings. It is therefore to be understood that the invention may be practiced otherwise than as specifically described.

I claim:

1. A high intensity strobe light having reduced electromagnetic radiation comprising,
   a source of light,
   a reflector,
   a light pipe for conducting light from said source of light to said reflector, and
   a waveguide surrounding said light pipe and proportioned to attenuate radio frequency energy below the cut-off frequency of said waveguide.

2. A high intensity strobe light having reduced electromagnetic radiation as set forth in claim 1 wherein said light pipe and said waveguide are cylindrical in shape and said waveguide has a ratio of length to diameter of at least three to one.

3. A high intensity strobe light having reduced electromagnetic radiation as set forth in claim 2 wherein said waveguide is a metallic tube.

4. A high intensity strobe light having reduced electromagnetic radiation as set forth in claim 2 wherein said waveguide is a conductive coating on the periphery of said light pipe.

5. A high intensity strobe light having reduced electromagnetic radiation as set forth in claim 1 wherein said light source includes a xenon flash tube.

6. A high intensity strobe light having reduced electromagnetic radiation as set forth in claim 5 wherein said xenon flash tube is mounted within a metallic housing made of material providing magnetic shielding against high level magnetic fields produced by said xenon flash tube.

7. A high intensity strobe light having reduced electromagnetic radiation comprising,
   a source of light,
   a light pipe having one end positioned near said source of light and having a reflecting surface integral with the other end, and
   a waveguide surrounding said light pipe and proportioned to attenuate radio frequency energy below the cut-off frequency of said waveguide.

8. A high intensity strobe light having reduced electromagnetic radiation as set forth in claim 7 wherein said light pipe and said waveguide are cylindrical in shape and said waveguide has a ratio of length to diameter of at least three to one.

9. A high intensity strobe light having reduced electromagnetic radiation as set forth in claim 7 wherein said waveguide is a metallic tube.

10. A high intensity strobe light having reduced electromagnetic radiation as set forth in claim 7 wherein said waveguide is a conductive coating on the periphery of said light pipe.

11. A high intensity strobe light having reduced electromagnetic radiation comprising,
    a metallic housing,
    a light tube within said housing,
    means for periodically flashing said light tube,
    a reflector,
    a light pipe for conducting light from said metallic housing to said reflector, and
    a waveguide surrounding said light pipe and proportioned to attenuate radio frequency energy emitted from said light tube.

12. A high intensity strobe light having reduced electromagnetic radiation as set forth in claim 11 wherein said waveguide is a metallic housing.

13. A high intensity strobe light having reduced electromagnetic radiation as set forth in claim 11 wherein said waveguide is a conductive coating on the periphery of said light pipe.

14. A high intensity strobe light having reduced electromagnetic radiation as set forth in claim 11 wherein said reflector is an integral part of said light pipe.

* * * * *